Jan. 1, 1929.  
P. E. BRENEMAN  
DOORCHECK  
Filed May 21, 1926
1,696,936
2 Sheets-Sheet 1
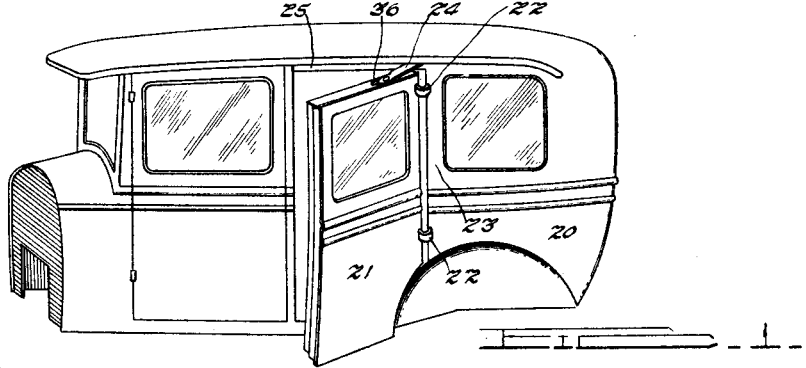
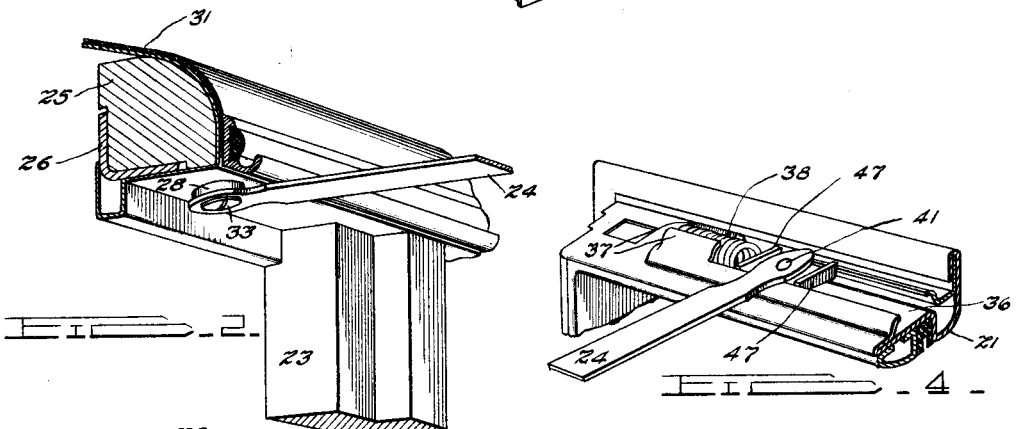
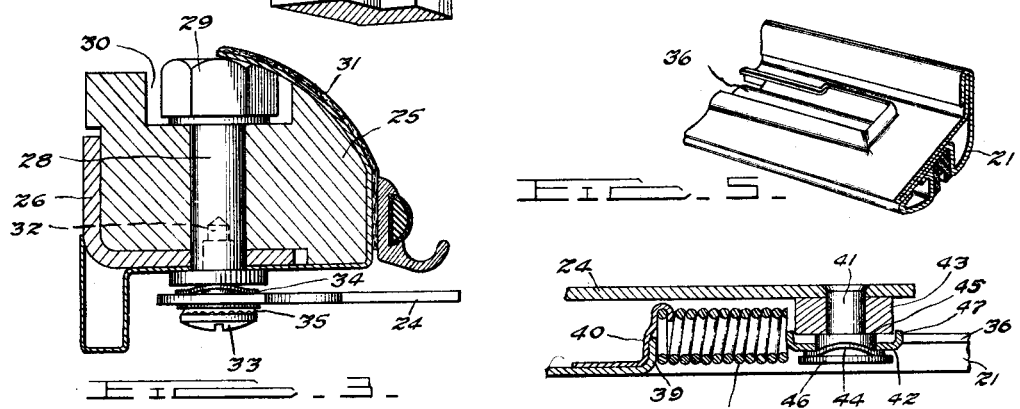
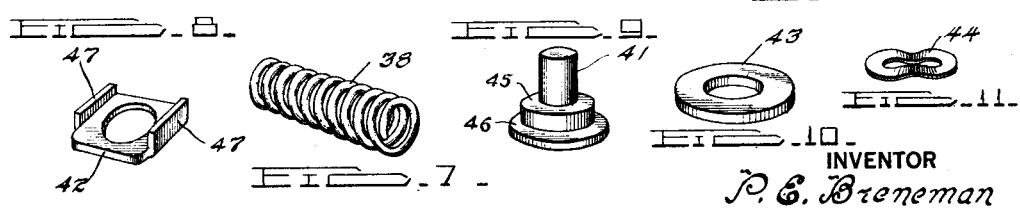
INVENTOR  
P. E. Breneman  
BY  
P. M. Pomeroy  
ATTORNEY

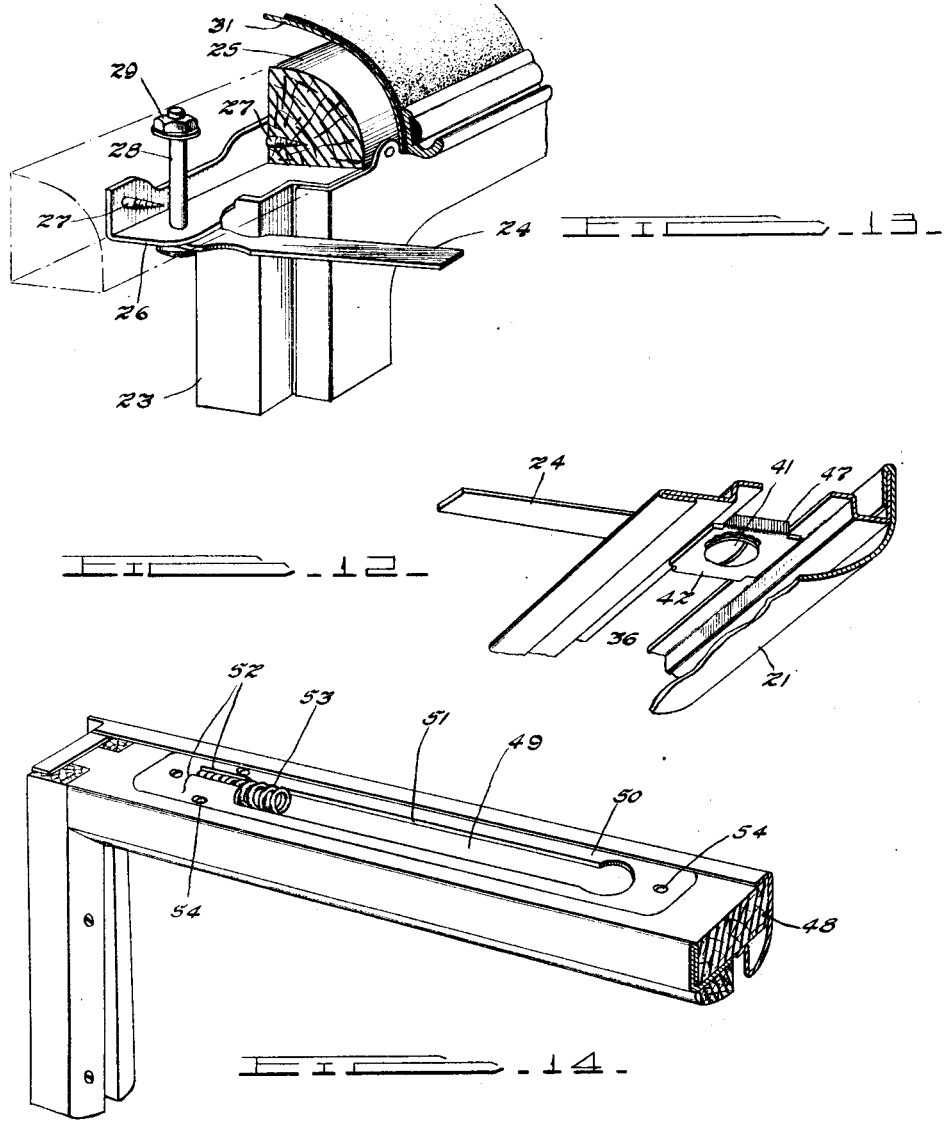

Patented Jan. 1, 1929.

1,696,936

UNITED STATES PATENT OFFICE.

PAUL E. BRENEMAN, OF DETROIT, MICHIGAN, ASSIGNOR TO THE STUDEBAKER CORPORATION, OF SOUTH BEND, INDIANA, A CORPORATION OF NEW JERSEY.

DOORCHECK.

Application filed May 21, 1926. Serial No. 110,691.

This invention relates to automobile body construction, and particularly to an improved door check construction therefor, the principal object being to provide a door check construction that will not rattle, and one in which the strain due to the shock of stopping the outward movement of a swinging door will not be taken solely by the roof rail.

Another object is to provide a door check for an automobile body, comprising an arm pivoted at one end thereof on or adjacent the body roof rail, and the free end thereof slidably received in a slotted member at the upper edge of the body door, the connection with such member being such as to resiliently embrace both upper and lower surfaces thereof whereby the free end of the arm is prevented from rattling.

Another object is to provide a door check for an automobile body comprising an arm pivoted to the body at one end and having its free end slidably received in a slot in the upper edge of a door for said body, the primary support or anchor for the pivoted end of the arm being a pillar of said body.

A further object is to provide a door check construction for an automobile body comprising a flange secured to the upper end of a pillar for said body, an arm pivotally secured at one end to said flange, and a slot in the upper edge of a door co-operating with said pillar for slidably retaining the free end of said arm.

The above being among the objects of the present invention, the same consists of certain features of construction and combinations of parts to be hereinafter described with reference to the accompanying drawings, and then claimed, having the above and other objects in view.

In the accompanying drawings, which illustrate a suitable embodiment of the present invention, and in which like numerals refer to like parts throughout the several different views, Figure 1 is a perspective view of an automobile body of the closed type showing a door thereof in partially opened position, and indicating the location of the door check covered by the present invention in relation thereto.

Figure 2 is a fragmentary perspective view of a portion of the body of Figure 1 including a portion of the roof rail and body pillar, showing more clearly the position of the door check arm in relation thereto.

Figure 3 is a vertical sectional view taken transversely through the roof rail at the point of pivot of the check arm.

Figure 4 is a fragmentary perspective view of a portion of the top of the door, showing the manner in which the free end of the check arm co-operates therewith, the arm being turned out of its normally true relation for the particular position of its end in the slot as shown, in order to more clearly illustrate the same.

Figure 5 is a fragmentary perspective view of that portion of the upper edge of the door embodying the opposite end of the check arm slot from that shown in Figure 4.

Figure 6 is a vertical sectional view taken longitudinally through the free end of the check arm and a portion of the upper edge of the door, showing the construction of the same and the position they assume when the door is in full open position with the buffer spring in fully compressed state.

Figure 7 is a perspective view of the buffer spring shown in Figures 4 and 6.

Figure 8 is a perspective view of the movable guiding member carried by the free end of the check arm.

Figure 9 is a perspective view of the pin member carried by the free end of the check arm.

Figure 10 is a perspective view of the spacer member carried by the free end of the check arm.

Figure 11 is a perspective view of the resilient waved washer carried by the free end of the check arm.

Figure 12 is a fragmentary perspective view of a portion of the upper edge of the door, looking up from beneath, with a portion of the metal of the door edge broken away to show more clearly the manner in which the end of the check arm co-operates therewith.

Figure 13 is a perspective view similar to that shown in Figure 2, but taken on a slightly different angle and showing the check arm pivoted to the rail attaching flange carried by the body pillar.

Figure 14 is a perspective view of a portion of the upper edge of a door of wooden frame construction, showing the slotted plate used in conjunction with the present invention when a wooden door frame construction is used instead of the sheet metal construction shown in the other figures.

In door checks of the general construction shown, it has heretofore been the practice to pivot one end of the check arm to the body roof rail only, thus subjecting this rail to all the shock incidental to checking the outward swing of the door. It has been common practice to reinforce the rail at the point of pivot, but even this has been found insufficient, particularly in view of the modern tendency in automobile body construction to use smaller and lighter rails, and splitting of the rail and loosening of the rail joints has often occurred upon checking a door that has been swung open with an unreasonable degree of force. It is one of the main objects of the present invention to provide a construction for the pivoted end of the check arm that will withstand such excessive shocks without damaging the body, and with this object in view a construction is shown in the accompanying drawings for accomplishing the same.

The check shown is of that general type in which an arm is pivoted at one end to the body and the other end is slidably confined in a slot in the upper edge of the door, the slidable end engaging the end of the slot upon the door being opened to check the outward swing thereof. The relative position of the check is illustrated in Figure 1 which shows an automobile body 20 of the closed type having a door 21 hinged at 22 to the body pillar 23, the door being shown in partly open position to indicate the position of the check arm 24 which is pivoted to the roof rail 25, it being pivoted to the lower edge or face thereof, as shown in Figure 2, and the free end is slidably received in the upper edge of the door 21, as shown in Figure 4, so that when the door 21 is closed the check is completely concealed between these two edges.

As best shown in Figure 13, the body pillar 23 is provided with an L-shaped flange 26 at its upper end which receives and positions and to which is secured the roof rail 25 by screws such as 27 which are shown passing through the vertical portion of the flange 26 thereinto. The flange 26 is preferably formed as part of the pillar itself, and where such pillar is of pressed metal construction the flange is preferably welded thereto so as to form an integral part thereof. A headed bolt 28 is passed up through the horizontal portion of the flange member 26 and through the rail 25, at a point towards the free edge of the door from the pillar 23, and receives a nut 29 on its upper end which draws the flange 26 and rail 25 into closely abutting position, a recess 30 being provided in the upper edge of the rail for receiving the nut 29 so that it may be covered by the usual roof covering material 31 without breaking the continuous smooth lines of the roof. The head of the bolt 28 is provided with a threaded axial opening 32 which receives the screw 33 which passes through one end of the arm 24 and pivotally anchors it thereto, spring washers such as 34 and 35 being provided on the screw 33 both above and below the end of the arm to resiliently hold the same from rattling.

The opposite or free end of the arm 24 is adapted to be slidably received in a slot in the upper edge of the door 21, and to this end the upper edge of the door, which is shown in all the views of the drawing except Figure 14 as being of pressed metal construction, is provided with a slot 36 punched in the upper face thereof; the metal surrounding the slot being bent upwardly and then inwardly towards the center thereof to provide clearance beneath the edges for parts secured to the free end of the arm which will be presently described. The metal displaced in forming the slot 36 immediately adjacent the end thereof nearest the pivoted edge of the door 21 is formed to provide two upwardly and inwardly disposed fingers 37 which are adapted to embrace a coil spring 38 which serves as a buffer for the free end of the arm 24 when the door is swung in full open position, the spring 38 being held from axial movement, as indicated in Figure 6, by an upwardly struck abutment 39 and a clip 40 which is provided with a hook end engaging the end coil of the spring 38 and a horizontal portion which is welded or otherwise secured to the upper edge of the door. The opposite end of the slot 36 is enlarged in width to permit insertion of the parts secured to the free end of the arm 24 which will now be described, and which are shown singly in Figures 8, 9, 10 and 11, and in assembled view in Figure 6.

These parts consist of a pin 41, guide member 42, spacer 43 and washer 44. The pin 41 is provided with double shoulders 45 and 46, and is adapted to be inserted in an opening in the free end of the arm 24, from below, the end which projects through the arm being preferably peened over or otherwise secured upon final assembly thereto. Before the pin 41 is thus secured to the end of the arm 24, the washer 44 is slipped thereover and followed by the guide member 42, after which the spacer 43 is added and the pin is then finally secured to the end as above described. The washer 44 and guide member 42 are provided with openings sufficiently large to allow them to pass the upper shoulder and bring the washer 44 into abutting relation with the lower shoulder 46, the washer 44 being waved and of relatively thin flexible metal so as to tend to resiliently hold the guide member 42 away from the shoulder 46. The spacer 43 abuts against the upper shoulder 45 and is held thereagainst when the pin 41 is inserted through the end of the arm 24 and peened over. In applying the end of the check arm to the door, the end is inserted in the enlarged end of the slot 36 and the guide member is forced downwardly away from the spacer 43 sufficiently to allow the edges of the slot to be entered therebetween, and the end is then slipped up into the slot 36 in this position and the guide member released, upon which the spring washer forces it up towards the spacer 43 and causes the edges of the slot 36 to be resiliently held between the same and the spacer 43. This causes the end of the arm 24 to be firmly but slidably confined in the upper edge of the door in a manner that prohibits rattling of the same.

The guide member 42 is, like the spacer 43, of greater width than the width of the slot 36 and is provided with upstruck tongues 47 at either end thereof of slightly less width than the slot 36, which are received in the slot 36 and are guided thereby. These tongues 47 serve to hold the member 42 centrally in respect to the slot 36, and the remaining parts are likewise affected thereby. The particular tongue 47 which is positioned nearest the pivoted edge of the door also serves to effect an enlarged surface for contacting with the spring 38 when the door is swung open, the spring in such case being compressed from free position such as indicated in Figures 4 and 7 to fully compressed state as indicated in Figure 6, thereby acting as a buffer and reducing the shock on the mechanism occasioned by the checking of the swing of the door.

The construction thus far described has been in connection with a door of pressed steel construction in which the upper member thereof has been slotted to provide means for retaining the end of the check arm. In Figure 14 is shown the method employed when the check construction is used on a door having a wooden frame. In such a case the wooden upper door frame member 48 is recessed as at 49 in its upper face, and a plate 50 provided with a slot 51, fingers 52 and buffer spring 53, corresponding to the slot 36, fingers 38 and spring 39 of the construction previously described, is secured to the upper edge of the door in overlying relation to the recess 49 by screws such as 54. The resulting construction is exactly the same in effect as the construction previously described.

It will be apparent from the foregoing that at least two main advantages result from the construction shown and described, the first being that the strain set up by the checking of an outwardly swinging door is taken up primarily by the relatively strong body pillar and not the roof rail, thus eliminating the possibility of splitting of the roof rail and loosening of the joints thereof and at the same time allowing a relatively lighter roof rail to be used; the second advantage being the provision of a simple and reliable means for preventing rattling of the free end of the check arm.

Formal changes may be made in the specific embodiment of the invention described without departing from the spirit and substance of the broad invention, the scope of which is commensurate with the appended claims.

What I claim is:—

1. In an automobile body, a door pillar provided with a roof rail receiving flange at the upper end thereof, a door having a metal frame including a top rail member provided with upturned flanges forming the walls of a slot formed in said member, said door being hinged to said pillar, and a door check arm pivotally secured at one end to said pillar flange and having its opposite end slidably retained in the slot in said rail member by means of the upturned flanges forming the walls of the slot.

2. In an automobile body, a door pillar provided with an elongated roof rail attaching flange at the upper end thereof, a door provided with a metal top rail having a slot in the upper face thereof pivotally supported on said pillar, and a link pivotally secured at its one end to the end of said flange nearest the free edge of said door and out of line with said pillar, said link having a rectangular block pivoted thereon adjacent the free end thereof, said block being slidably received in said slot and retained therein by said top rail.

3. In combination, a door pillar supporting a top side rail, a door hinged to said pillar provided with a horizontally disposed sheet metal top edge rail having a slot formed therein, and a door check arm pivotally secured at one end to said top side rail and slidably received at its opposite end in said slot and retained therein by said top edge rail.

4. In combination, a door pillar provided with a top flange, a sheet metal door hinged to said pillar provided with a horizontally disposed top edge member having a slot formed therein, the edge of the metal defining said slot being struck up above the plane of said member, and a check arm pivotally secured at one end to said flange and provided with a downwardly projecting pin at the opposite end slidably received in said slot and retained therein by the struck up free edges of the metal forming the walls of said slot.

5. In combination with an automobile body provided with a door pillar provided with an attaching flange at the upper end thereof, a check arm pivotally secured to said flange and provided with a downwardly projecting pin at its free end, a door comprising a sheet metal panel provided with a combined sheet metal top edge and reinforcing member secured thereto, said reinforcing member being formed to provide a slotted raised portion for receiving and slidably guiding said pin, and means for resiliently holding said pin against rattling.

6. In combination, a door pillar provided with a top flange, a sheet metal door hinged to said pillar and provided with a horizontally disposed top edge member having a slot formed therein, the metal forming the slot being raised out of the normal plane of said edge member, upstruck fingers integral with the slot defining edges adjacent one end of said slot embracing a resilient buffer, and a check arm pivotally secured to said flange provided with a downwardly projecting pin at its opposite end, and carrying means for guiding said pin in said slot and resiliently holding the same against rattling.

7. In an automobile body, the combination with a door pillar, of a door comprising an integral slotted sheet metal rail member at its upper edge hinged on said pillar, an arm pivoted at one end on said pillar having a pin on its opposite end, a spacer member on said pin, and a guiding member having portions extending beyond the transverse edges of said slot carried by said pin and resiliently urged toward said spacer member to permit the metal forming the edges of said slot to be introduced between said spacer member and the extending portion of said guiding member whereby the end of said arm is resiliently held from rattling.

8. In an automobile body, the combination with a door pillar, of a door having an integral slotted sheet metal rail member at its upper edge hinged on said pillar, an arm pivotally secured to said pillar, a headed pin on the free end of said arm, a spacer member and a slidably movable guiding member on said pin, and a spring tending to move said guiding member into engagement with said spacer member, said guiding member being separate from said spacer member and introduced below said slot whereby the edges of the metal forming said slot are resiliently grasped between said guiding member and said spacer member.

9. In an automobile body, the combination with a stationary member, of a door having a slotted sheet metal member at its upper edge engageable with said stationary member, an arm pivotally secured to said stationary member, a pin at the free end of said arm extending through said slot and having a shoulder and a head thereon, a spacer member secured on said pin between said shoulder and said arm and abutting against the upper face of said slotted member, a slidable member mounted on said pin, a spring washer on said pin between said head and said slidable member tending to draw said pin through said slot, and upwardly extending projections on said slidable member engaging the walls of said slot for holding said pin centrally in relation thereto.

10. A sheet metal door having a horizontally disposed top edge member provided with a slot therein to receive a door check arm, the edges of the metal defining said slot being struck up above the plane of said member, and tongues extending inwardly beyond the normal free edges of the metal defining said slot for embracing a resilient stop for said arm.

11. A sheet metal door having a top member folded to provide a horizontal portion, a flange extending vertically therefrom, and an offset portion to form a side of a glass receiving channel, said horizontal portion having struck up flanges forming guides for a door check.

12. A sheet metal door having a top member formed to provide a horizontal portion terminating in a vertical flange, and a second horizontal portion having an offset portion forming a side of a glass receiving channel, said first horizontal portion having struck up flanges to form guides for a door check.

13. A sheet metal door having a top member formed to provide two horizontal portions, one overlying the other, the upper portion having struck up flanges forming guides for a door check, and a lower portion forming a cover for the door check.

14. A sheet metal door having a top member formed to provide two horizontal portions, one overlying the other, the upper portion having struck up flanges forming guides for a door check, and a lower portion being offset adjacent to one edge thereof to thereby form two walls of a glass receiving channel.

15. A sheet metal door having a top member formed from a single piece of metal to provide a horizontal portion terminating in a vertical flange, and a second horizontal portion having an offset therein to form a side of a glass receiving channel, the free edge of said offset portion being secured to said flange, said first horizontal portion having flanges struck up therefrom to form guides for a door check.

Signed by me at Detroit, Michigan, U. S. A., this 12 day of May, 1926.

PAUL E. BRENEMAN.